United States Patent
Tillman et al.

(10) Patent No.: US 8,780,899 B2
(45) Date of Patent: Jul. 15, 2014

(54) METHOD AND SYSTEM FOR IMPROVING TRAFFIC DISTRIBUTION ACROSS A COMMUNICATION NETWORK

(75) Inventors: Mark Tillman, Christchurch (NZ); Graeme Campbell, Christchurch (NZ)

(73) Assignee: Allied Telesis Holdings K.K., Tokyo (JP)

( * ) Notice: Subject to any disclaimer, the term of this patent is extended or adjusted under 35 U.S.C. 154(b) by 738 days.

(21) Appl. No.: 11/656,553

(22) Filed: Jan. 23, 2007

(65) Prior Publication Data

US 2007/0171908 A1  Jul. 26, 2007

Related U.S. Application Data

(60) Provisional application No. 60/760,957, filed on Jan. 23, 2006.

(51) Int. Cl.
*H04L 12/28* (2006.01)
*H04L 12/56* (2011.01)

(52) U.S. Cl.
USPC ............ 370/389; 370/351; 370/473; 370/474

(58) Field of Classification Search
USPC ......... 370/400, 389, 889, 390, 419, 463, 351, 370/391, 473, 465
See application file for complete search history.

(56) References Cited

U.S. PATENT DOCUMENTS

| | | | |
|---|---|---|---|
| 6,628,655 B1 * | 9/2003 | Fieschi et al. | 370/389 |
| 7,379,435 B1 * | 5/2008 | Kinder | 370/324 |
| 7,899,929 B1 * | 3/2011 | Beser | 709/238 |
| 2001/0052023 A1 * | 12/2001 | Lin et al. | 709/237 |
| 2002/0141412 A1 * | 10/2002 | Wong et al. | 370/392 |
| 2003/0028886 A1 * | 2/2003 | Wang et al. | 725/78 |
| 2004/0047349 A1 * | 3/2004 | Fujita et al. | 370/389 |
| 2005/0005006 A1 * | 1/2005 | Chauffour et al. | 709/223 |
| 2006/0104271 A1 * | 5/2006 | Samudra | 370/389 |
| 2006/0114902 A1 * | 6/2006 | Kalkunte et al. | 370/389 |
| 2006/0168265 A1 * | 7/2006 | Bare et al. | 709/230 |
| 2006/0242543 A1 * | 10/2006 | LaVigne et al. | 714/776 |
| 2006/0251085 A1 * | 11/2006 | Kalkunte et al. | 370/400 |

* cited by examiner

*Primary Examiner* — Anez Ebrahim
(74) *Attorney, Agent, or Firm* — Arent Fox LLP

(57) ABSTRACT

A system and method for distributing data across a network including a plurality of trunked port lines, including modifying an existing field within one layer of a data packet on the basis of information found within another layer of the data packet and restricting the process of trunking distribution to only consider the modified layer. In an exemplary embodiment, a method and a system for improving packet data distribution across a communication network environment is provided that changes a field within the Layer 2 (L2) section of the packet on the basis of fields within the Layer 3 (L3) section of the packet. This may involve changing the destination Media Access Control (MAC) address on the basis of the destination IP address and limiting the trunk distribution determination to the L2 section of the packet data.

34 Claims, 4 Drawing Sheets

METHOD AND SYSTEM FOR IMPROVING TRAFFIC DISTRIBUTION ACROSS A COMMUNICATION NETWORK

BRIEF DESCRIPTION OF INVENTION

This application is based upon and claims the benefit of priority from prior U.S. Provisional Application No. 60/760,957 filed on Jan. 23, 2006, the entire contents of which are incorporated hereby by reference.

FIELD OF THE INVENTION

The present invention is generally directed to a method and system for improving data traffic distribution across a communication network environment such as token ring, ATM, Ethernet, Fast Ethernet, and Gigabit Ethernet environment, and in particular to a method and system for high performance packet distribution, routing and/or switching across a communication network with trunked ports, such as trunked Ethernet ports. Moreover, the present invention can be applied to any packet based media environment. In particular, the present invention relates to a packet distribution method and/or system that can be implemented on a semiconductor substrate, such as a silicon chip.

BACKGROUND OF THE INVENTION

In networking applications, an incoming packet enters an input port of a network component, such as a data processing node or a switch, wherein the network component processes the incoming packet and directs it to an output port. In processing the incoming packet, the network component can examine the incoming packet on the input side of the network component, and can determine addressing and routing information to enhance network performance.

For instance, network components, such as an Ethernet switch, can have several output ports, trunked together either externally or in the backplane of a chassis based switch. Trunking involves the use of multiple network cables or ports in parallel. Trunks may be used to interconnect switches to form networks. Trunking increases the link speed beyond the limits of any single cable or port. Often, distribution of packet traffic is not done evenly across the trunked ports causing inefficient use of the total available bandwidth.

Current trunk distribution technology can lead to congestion, for example, a large number of traffic flows being distributed down certain ports while other ports have only a light amount of traffic distributed to them. This can cause the trunk group to function inefficiently by not being able to carry as much traffic as would be possible if the flows were evenly distributed.

In addition, different ports in a trunk may take different amounts of time to transmit a packet. Thus, packet traffic can sometimes be delivered to their final destination out of order, causing significant delay or failures in the transmission of information across the communication network. Almost all high level networking protocols require that the data packets associated with them arrive in order. Thus, packets of data should not be randomly distributed among different lines of a trunk group.

When a related flow of data packets, such as an Ethernet flow, is sent through a group of ports that are trunked together, the flow must be sent down a single port. If packets from the same flow are sent down different ports, it is possible that they will be delivered out of order. Delivering packets out of order causes a very detrimental effect on higher layer Ethernet protocols such as Transmission Control Protocols/Internet Protocol (TCP/IP).

When a group of several ports are trunked together, an algorithm is needed to distribute flows of traffic, such as Internet Protocol (IP) traffic, evenly so that the total available bandwidth can be used. However, as described above, each flow between network endpoints must go down a single port of the trunk to ensure that the packets are not delivered to their final destination out of order.

A typical trunk distribution algorithm involves manipulating various fields within the header structure of a packet to form a hash value and this value is used to determine the port to which the packet will be sent. The hash algorithm used is typically the Exclusive OR (XOR), or sometimes, a Cyclic Redundancy Check (CRC), such as CRC16. Using a CRC redundancy check on different fields of the packet distributes data packets in a more random way than the use of an XOR hash. A hash key is created and then a part of the key field is used as an index in order to determine which port in the trunk will be used. A relatively simple hash distribution algorithm is important because the hash value must be calculated for each packet at the rate at which it arrives at the switch chip (i.e. at "wire speed").

However, these algorithms tend to fail during testing with artificially generated test traffic when certain fields are incremented together to define each flow. When the fields are processed using the XOR operation, a single index is produced and all the traffic is directed down a single port of the trunk. Similar problems are found in real world systems such as server farms which have very similar header fields for each flow.

In these typical systems, there is usually some degree of control provided over what fields are used in the calculation of the hash value. This degree of control usually allows the use of any of: just Layer 2 (L2) fields; L2 and Layer 3 (L3) fields; or L2, L3, and L4 fields. "Layer" references, such as Layer 2 (L2) and Layer 3 (L3) refer to the Open Systems Interconnection (OSI) seven layer model. However, finer control of the fields may be provided. There may also be some degree of control over the hash algorithm. For example, a selection between XOR and CRC16 hash generation may be provided.

However, regardless of the degree of control provided over what fields are used in the calculation of the hash value and over the hash algorithm, these algorithms are fixed by the logical design of the switch chip with which they are used and these algorithms cannot be readily changed to adapt to changing network conditions or congestion caused by a particular test configuration.

SUMMARY OF INVENTION

In view of the above, there is a need for a method and system for a network component to apply efficient, speedy, and accurate addressing and processing logic to an incoming packet such that total available bandwidth is used and that the packets are distributed in the right order.

The present invention solves the above-identified needs, as well as others by providing a system and method that distributes packet data evenly across ports in a trunk group while ensuring that packets arrive at a receiver in the same order that they were sent from the transmitter.

The present invention involves modifying at least one existing field within one layer of the data packet on the basis of information found within another layer of the data packet and restricting the process of trunking distribution to only consider the modified layer.

This establishes the route of the packet data in a way that does not interfere with the delivery of the packet to its final destination, but does ensure that the distribution of traffic across individual links of a trunk group in a network is even.

In one exemplary embodiment of the present invention, a method and a system for improving packet data distribution across a communication network environment is provided that changes at least one field within the Layer 2 (L2) section of the packet on the basis of at least one field within the Layer 3 (L3) section of the packet. This may involve changing the destination Media Access Control (MAC) address on the basis of the destination IP address and limiting the trunk distribution determination to the L2 section of the packet data. As both the L2 and L3 sections of the data packet include multiple fields, a plurality of fields from the L3 section may be used to modify a plurality of fields in the L2 section of the data packet.

Among other things, this system and method improves the distribution of individual traffic flow across ports within a trunk group while ensuring the proper order of delivery. The present invention improves the distribution of packet data flows so that a greater amount of traffic can be carried across a trunk group without congestion of the data packets. Other features and advantages will be apparent to persons of ordinary skill in the art from the detailed description of the invention and the accompanying drawings.

BRIEF DESCRIPTION OF THE FIGURES

For a more complete understanding of the present invention, the needs satisfied thereby, and the objects, features, and advantages thereof, reference is now made to the following description taken in connection with the accompanying drawings. Identical parts in the several views of the drawings use the same reference numbers.

DETAILED DESCRIPTION

The present invention overcomes the problems associated with current trunk distribution algorithms by allowing more complex and accurate hashing algorithms to be used that do not need to be calculated at the packet data rate, but can be calculated "offline." The present invention also allows the hashing algorithm to be modified dynamically to reflect changing network conditions or configurations.

By modifying a layer of the packet data according to an internally visible destination address for each flow of packet data based on another layer of the packet data and restricting the trunking distribution algorithm to only look at the modified layer the low complexity trunk distribution algorithm that is required to operate in real time can be replaced with a more sophisticated algorithm with better distribution properties that does not need to operate in real time.

Figure 1:
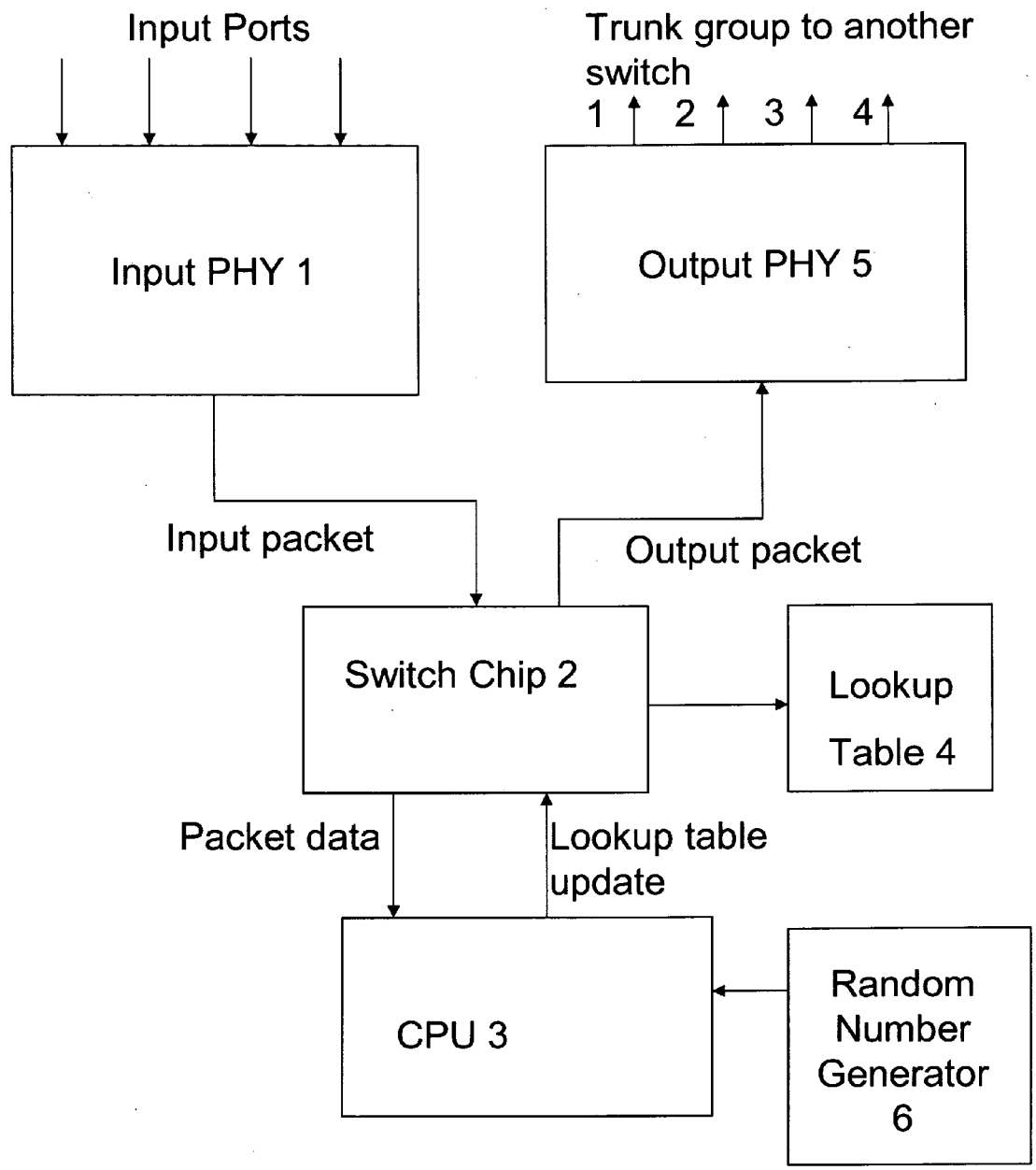
FIG. 1 depicts a system according to an embodiment of the present invention.

FIG. 1 shows a system diagram of an exemplary embodiment of the present invention. In FIG. 1, packets of data are received by the input physical layer protocol (PHY) 1. As depicted in FIG. 1, the input PHY 1 may receive data packets from a plurality of input ports. The data packets are transferred to a switch chip 2. Depending on the contents of the packet header, the packet is either directed by the switch chip 2 to the output PHY 5 or to the CPU 3. Packets received by the CPU 3 are examined and used to update the contents of the lookup table 4. The lookup table 4 may be internal to the switch chip 2 or may be external memory connected to the switch chip, for example, by a memory bus.

In FIG. 1, an exemplary embodiment is shown having four ports attached to the output PHY 5. Although this embodiment is shown with four ports trunked together, the invention will work with any number of two or more ports trunked together.

Variations of the exemplary embodiment may further include a random number generator 6, as will be described in more detail.

Current communication components do not provide uniform distribution of flows when certain fields in the packet are strongly correlated. For example, in automated testing of trunk capacity a new flow may be generated that differs from the previous flow only by an increment in the destination Media Access Control (MAC) address and the destination IP address. The MAC address is the physical address or the Layer 2 address, whereas the Layer 3 address is the network address or virtual address. The strongly correlated destination MAC address and/or destination IP address in the new flow and the previous flow in this example may cause the new flow to be sent down the same port as the old flow, which can create congestion on this single port within the trunk group.

The present invention avoids such congestion by modifying at least one existing field within one layer of the data packet on the basis of information within another layer of the data packet and restricting the process of trunking distribution to only look at the modified layer.

In an exemplary embodiment, the present invention involves changing at least one field within the L2 section of a data packet on the basis of at least one field within the L3 section of the packet. In this exemplary embodiment, the destination MAC address may be modified based on the destination IP address. As both the L2 and L3 sections of the data packet include multiple fields, a plurality of fields from the L3 section may be used to modify a plurality of fields in the L2 section of the data packet.

For example, the L2 section includes both source and destination MAC address fields and a VLAN ID field along with other information. The L3 section includes both source and destination IP addresses along with other information. Therefore, the present invention may involve: (1) modifying one field within a first layer based on information from one field of a second layer; (2) modifying one field within a first layer based on information from a plurality of fields of a second layer; (3) modifying a plurality of fields within a first layer based on information from one field of a second layer; or (4) modifying a plurality of fields within a first layer based on information from a plurality of fields within a second layer. "Layer" references, such as Layer 2 (L2) and Layer 3 (L3) refer to the Open Systems Interconnection (OSI) seven layer model.

By providing a substitute L2 section of the packet, as described in the exemplary embodiment, the L2 section of the packet is not based on network protocols but on values that will provide an even distribution of flows across a trunk group. Then, the decision on which line of the trunk the packet will travel will be based on the destination MAC address, not the destination IP address. Although L2 and L3 are discussed in connection with this embodiment, other combinations of layers are possible in the present invention.

For example, in a trunk group having four member ports, the L2 section of a data packet coming into the input side of the network component can have one of four destination MAC addresses substituted based on the L3 address, for example the packet destination IP address or the destination IP subnet. The substitute L2 destination MAC address can be chosen using a lookup table. The four destination MAC addresses in the look up table may, for example, differ only in the two least significant bits. Then, the trunking distribution algorithm is restricted to only look at the low order destination MAC address bits In an exemplary embodiment, the look up table may be created such that the two low order bits of the four MAC addresses are determined by the sequence in which the IP address was first learned. Other methods of creating the look up table are also possible.

The port distribution logic for the trunk group is set to exclude the basis section for the substituted section of the data packet from the port determining calculation, such as the XOR hash calculation. Thus, in the example given above, where the MAC address is substituted based on the destination IP address, the port distribution logic for the trunk group would be set to exclude the destination IP address from the XOR hash calculation. This allows even traffic distribution across the ports of the trunk group even when certain fields in the packet are strongly correlated.

Figure 2:
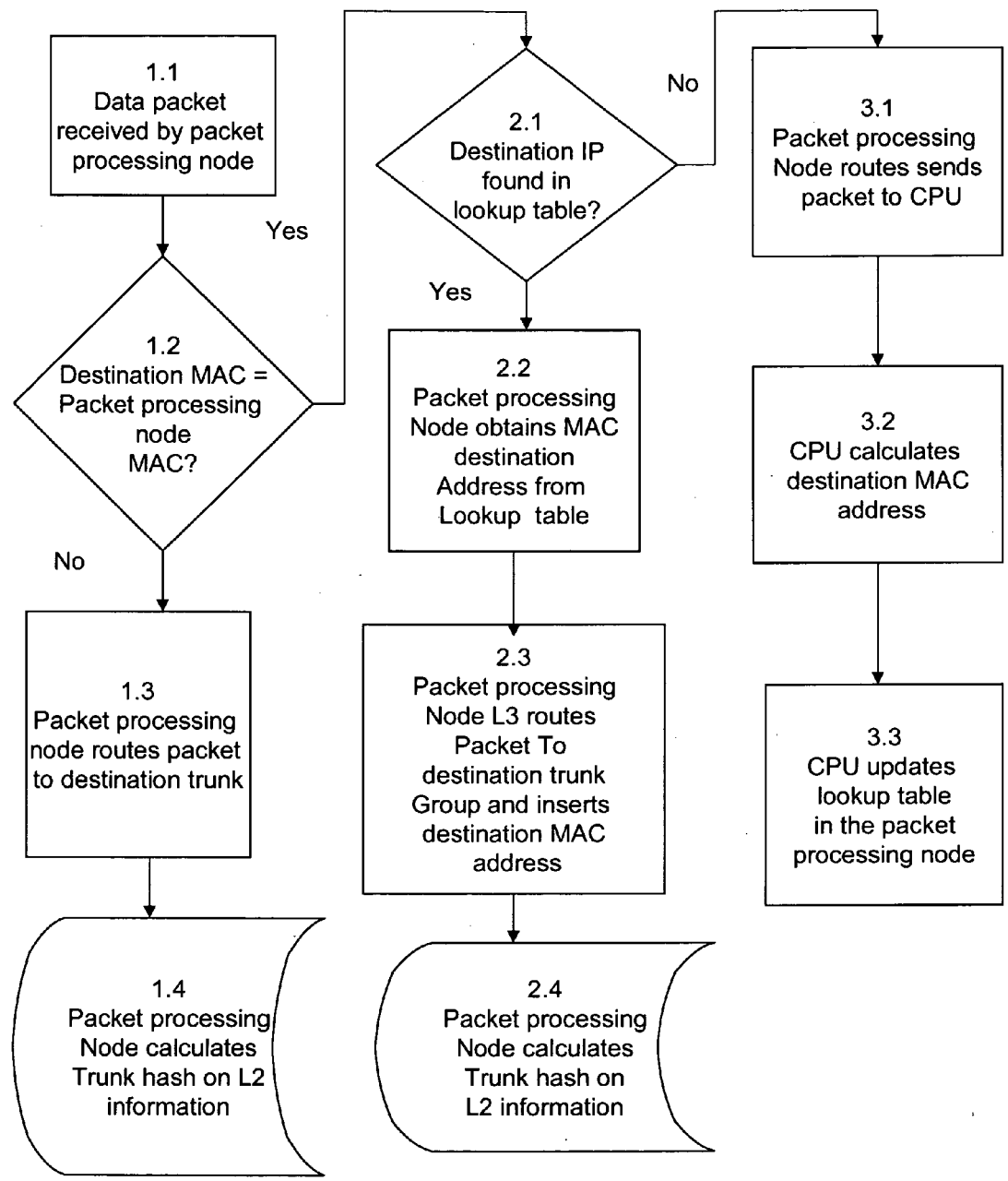
FIG. 2 is a flow diagram describing a method according to an embodiment of the present invention.

FIG. 2 shows a packet flow diagram according to an exemplary embodiment of the present invention.

In step 1.1, a data packet is received by a data processing node, such as a switch chip. The data packet may be, for example, an Ethernet packet. In step 1.2, the header of the packet is analyzed to determine if the destination MAC address of the packet is the same as the MAC address of the packet processing node. The data processing node determines whether the data packet should be routed to another network or locally switched by determining if the packet is destined/addressed to this switch.

If the MAC address of the packet is not the same as the MAC address of the packet processing node, the data packet needs to be routed to another network. The data processing node routes the packet to the destination trunk in step 1.3. If the data processing node is a switch chip, the switch chip performs an L2 switch operation on the data packet. In step 1.4, a hash calculation is performed by the data processing node in order to determine on which port of the trunk the packet will be sent.

If, however, the destination MAC address of the packet is the same as the MAC address of the data processing node, then the data processing node looks up the destination IP address of the packet in a data lookup table in step 2.1. The data processing node may have several MAC addresses assigned to it, in which case step 2.1 is taken if the header destination MAC address of the packet is equal to any of the MAC addresses assigned to the data processing node. In step 2.1, if the destination IP address is found in the lookup table, then the process moves to step 2.2 and the destination MAC address for the packet is retrieved from the lookup table. For example, the destination MAC address for the packet may be retrieved from a "next hop" table associated with the IP address lookup table. Then, in step 2.3, a Layer 3 (L3) routing operation is performed on the packet. Then, in step 2.4, a hash calculation is performed by the packet processing node to determine which port of the trunk the packet will be sent on.

For example, in step 2.4, the hash calculation may be performed through an algorithm calculating the destination MAC address for the packet based on information in the header of the packet. A destination MAC address is reserved for each port in the output trunk. Therefore, in the embodiment shown in FIG. 1, a total of four MAC addresses are reserved. The MAC addresses are selected so that the trunk hash calculation in step 2.4 will send each MAC address down a different port. Step 2.4 makes a similar decision to 1.4. The higher level switching decisions have been made, and step 2.4 merely determines which line in the trunk the packet data will be sent down.

The entire diagram in FIG. 2 relates to packet flow. However, not every decision in the diagram is made on one packet processing node or switching chip for the entire network. Some decisions may be made at one switching node and other at another switching node as the packets flow through the network.

Specifically, steps 2.3 and 2.4 can refer to different packet processing nodes. For example, 2.3 and 2.4 may be performed by two different switch chips. Thus, if there is an intervening segment of network between steps 2.3 and 2.4, the invention will still function effectively, where others will not. The prior methods of distribution are especially ineffective when removed from the point at which the trunk lines diverge. Thus, if the other methods are practiced one or two nodes back, they do not effectively distribute packet data. The present invention overcomes this drawback by affecting the even distribution of traffic over a trunk even when distant from the trunk.

If, however, in step 2.1, the destination IP address is not found in the lookup table, the packet processing node sends the packet to the CPU in step 3.1. Then, the CPU calculates a destination MAC address for the packet. The CPU may have a large table of possible addresses and will perform a calculation to provide a good spread of packet traffic across the trunked ports. In step 3.3, the CPU updates the lookup table associated with the packet processing node. Thereafter, the data processing node performs step 2.1, for which the newly added IP destination address will be found in the lookup table and the system goes through steps 2.2-2.4 as discussed above.

An example of a possible hashing algorithm used in the trunk calculation is $$HASH = MAC_{0-7} \text{ XOR } MAC_{8-15} \text{ XOR } MAC_{16-23} \text{ XOR } MAC_{24-31} \text{ XOR } MAC_{32-39} \text{ XOR } MAC_{40-47}$$

where the bottom two bits of the hash results are used to select the output port as shown in Table 1 below. In this example, the MAC addresses designed so that the trunk hash calculation will send data packets with each MAC address down a different port could be selected as:

MAC address 1=aa-bb-cc-dd-ee-00
MAC address 2=aa-bb-cc-dd-ee-01
MAC address 3=aa-bb-cc-dd-ee-02
MAC address 4=aa-bb-cc-dd-ee-03

TABLE 1

| $HASH_1$ | $HASH_2$ | Port Number |
|---|---|---|
| 0 | 0 | 1 |
| 0 | 1 | 2 |
| 1 | 0 | 3 |
| 1 | 1 | 4 |

In the above description, $MAC_{16-23}$ indicates bits 16 to 23 of the destination MAC address and $HASH_1$ indicated bit 1 of the computed hash index.

In an alternative embodiment of the present invention, several MAC addresses may be reserved for each trunked port. In this alternative embodiment, the MAC addresses are selected so that if each of the MAC addresses in turn were substituted into a packet as the destination MAC address, while the rest of the packet were unchanged, then equal numbers of packets would be sent over each port within the trunk group.

The reserved MAC addresses can be allocated to destination IP addresses in several ways. The following are merely exemplary embodiments of various methods of allocation. However, these embodiments are merely illustrative. Many variations and modification will be apparent to those skilled in the art.

Exemplary Methods of Allocating Reserved MAC Addresses to Destination IP Addresses A. The MAC addresses may be assigned sequentially as each new IP address is received by the CPU, as shown in Table 2.

TABLE 2

| IP Address Arrival Sequence | MAC Address |
|---|---|
| 1 | aa-bb-cc-dd-ee-00 |
| 2 | aa-bb-cc-dd-ee-01 |
| 3 | aa-bb-cc-dd-ee-02 |
| 4 | aa-bb-cc-dd-ee-03 |
| 5 | aa-bb-cc-dd-ee-00 |
| 6 | aa-bb-cc-dd-ee-01 |
| ... | ... |

B. The MAC addresses can be derived from a calculation based on the destination IP address. For example, the CRC16 hash of the destination IP address can be calculated. Then, the two low order bits of the resultant hash can be used to determine the destination MAC address as indicated in Table 3.

TABLE 3

| $CRC16_1$ | $CRC16_0$ | MAC address |
|---|---|---|
| 0 | 0 | aa-bb-cc-dd-ee-00 |
| 0 | 1 | aa-bb-cc-dd-ee-01 |
| 1 | 0 | aa-bb-cc-dd-ee-02 |
| 1 | 1 | aa-bb-cc-dd-ee-03 |

C. The MAC address may be assigned by determining the port with the lowest amount of traffic in a defined period and assigning a destination MAC address that will route the traffic over the port.

For example, the amount of traffic on each port within the trunk may be calculated for a 0.1 second period, and the lowest amount of traffic may be recorded on port 3. An IP address may be received by the CPU which may then be assigned a MAC address of aa-bb-cc-dd-ee-02 so that the traffic with that destination IP address will be sent down port 3 of the trunk group.

D. As a variation of the method used in C, the MAC address may be assigned by determining the port with the lowest amount of traffic in a defined time period and assigning a destination MAC address that will route traffic over that port, unless the traffic on all ports is below a critical threshold corresponding to congestion on the trunk group. If the traffic on all ports is below the critical threshold, then the MAC addresses are assigned sequentially, as described in A. Using method C in low traffic conditions could cause all new IP addresses received by the CPU to be allocated a destination MAC address corresponding to a single port, thereby creating congestion. Method D removes this potential disadvantage.

E. The MAC addresses may be defined so that the probability of a given MAC address being assigned is proportional to the amount of free bandwidth available to carry traffic on the corresponding port within the output trunk For example, the amount of traffic on each port within the trunk may be calculated for a 0.1 second period and may be subtracted from the total capacity of that port. If the ports each have a capacity of 1 Gbps and the average traffic over a 0.1 second period on port 1 is 400 Mbps, then the available capacity on that port is calculated as 1000−400=600 Mbps.

Table 4 shows an exemplary calculation of probabilities. The calculation involves calculating the available capacity of a given port and dividing that by the total available capacity for all ports in the trunk group to obtain the probability that the MAC address corresponding to that port will be assigned to a new IP address as received by the CPU. In the example, the total available capacity of all ports is 2000 Mbps so that the desired probability of assigning a MAC address corresponding to port #1 is 30%. Similarly, the probabilities of assigning a MAC address corresponding to port #2, port #3, and port #4 are 20%, 40%, and 10% respectively.

The MAC address is then determined by calculating a random number with the Random Number Generator 6, as shown in FIG. 1, and assigning a range of random numbers to each MAC address where the size of the range is proportional to the desired probability of that MAC address being selected.

In an example, the random numbers may be integers that range from 1-100. For example, when a new IP address is received by the CPU a result of 76 may be obtained from the random number generator. This random number corresponds to MAC address aa-bb-cc-dd-ee-02 and to port #3 in Table 4.

TABLE 4

| Port Number | Average Traffic Mbps | Available Capacity | MAC address corresponding to port | Probability | Random Number Range |
|---|---|---|---|---|---|
| 1 | 400 | 600 | aa-bb-cc-dd-ee-00 | 30% | 1-30 |
| 2 | 600 | 400 | aa-bb-cc-dd-ee-01 | 20% | 31-50 |
| 3 | 200 | 800 | aa-bb-cc-dd-ee-02 | 40% | 51-90 |
| 4 | 800 | 200 | aa-bb-cc-dd-ee-03 | 10% | 91-100 |

Although the previous example described the present invention used with four ports in a trunk group, the present invention is not limited in use to a trunk group with any particular number of ports. The present invention can be used with a trunk group having any number of two or more ports.

Figure 3:
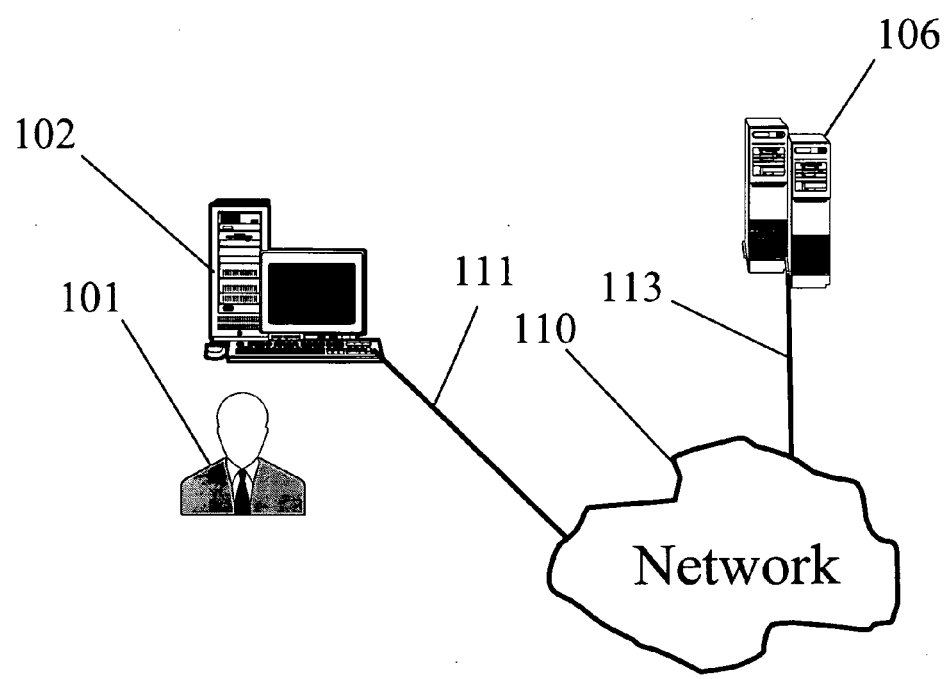
FIG. 3 is a diagram of an exemplary computer system that may be used in connection with the present invention.

FIG. 3 shows various features of an example computer system for use in conjunction with an embodiment of the present invention. As shown in FIG. 3, the computer system is used by a user 101 to access data, make calculations, and perform other steps in accordance with methods of the present invention, such as by using software and other computer features located on a server or other network device 106. Access occurs, for example, via a terminal 102, network (e.g., the Internet ) 110, and couplings 111, 113. The terminal 102 may comprise, for example, a personal computer (PC), minicomputer, mainframe computer, microcomputer, telephone device, personal digital assistant (PDA), or other device having a processor and input capability. The server 106 may comprise, for example, a PC, minicomputer, mainframe computer, microcomputer, or other device having a processor and a repository for data or that is capable of accessing a repository of data. Couplings 111, 112 may include wired, wireless, or fiber-optic links.

Figure 4:
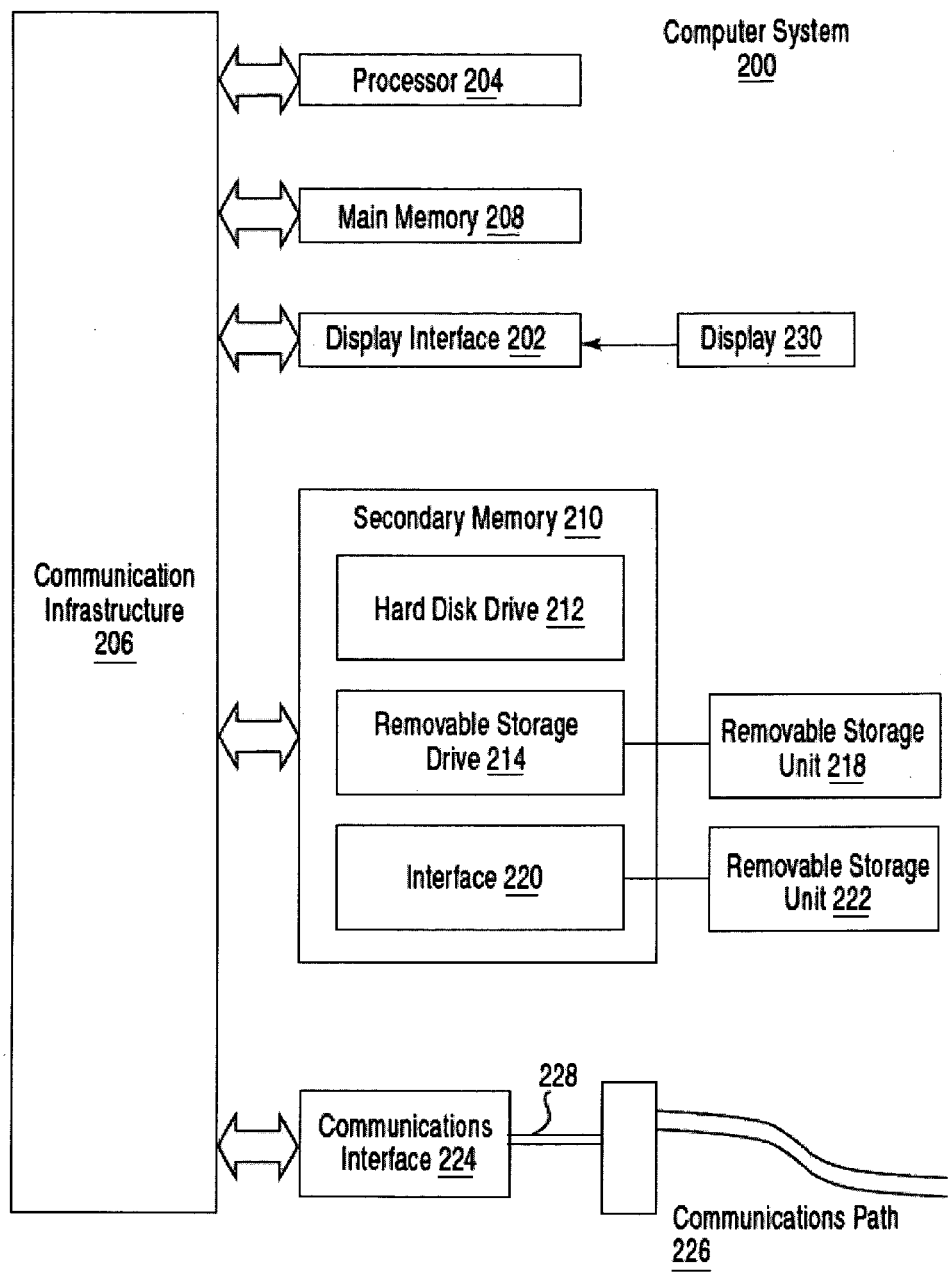
FIG. 4 is a diagram of an exemplary computer system that may be used in connection with the present invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 4.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Example embodiments of the present invention have now been described in accordance with the above advantages. It will be appreciated that these examples are merely illustrative of the invention. Many variations and modifications will be apparent to those skilled in the art.

What is claimed is:

1. A method for data distribution across a trunked network, the method comprising:
   receiving a data packet at a packet processing node, the data packet including at least two layers, each layer including a plurality of existing fields;
   upon receipt of the data packet, modifying at least one existing field in a first layer of the data packet based on information in at least one existing field in a second layer of the data packet and based on a lookup table, and wherein the modified information in the at least one existing field in the first layer includes a modified Media Access Control (MAC) address, and the lookup table includes a plurality of MAC addresses corresponding to a plurality of ports in the trunked network, wherein each of the plurality of MAC addresses includes a plurality of order bits including highest and lowest bits, and wherein the MAC addresses differ only in a limited selection of at least one bit; and
   determining the line of the trunked network that the data packet will be sent to based on the at least one modified field representing the first layer of the data packet.

2. The method of claim 1, wherein the at least one existing field in the first layer comprises at least one Layer 2 field.

3. The method of claim 2, wherein modifying the at least one Layer 2 field includes modifying the Media Access Control destination address, 4. The method of claim 3, wherein the second layer of the data packet is Layer 3.

5. The method of claim 4, wherein the Layer information includes the destination Internet Protocol address.

6. The method of claim 1, further comprising determining the modification to the at least one existing field in the first layer of the data packet, where determining the modification includes consulting the lookup table.

7. The method of claim 6, further comprising deters determining whether the information in the second layer is contained in the lookup table;

if the information in the second layer is contained within the lookup table, modifying the at least one field according to the lookup table; and if the information in the second layer is not contained within the lookup table, sending information regarding the packet data information to a Central Processing Unit.

8. The method of claim 7, further comprising:
assigning a modification to the at least one existing field in the first layer based on the information in the second layer: and
updating the lookup table.

9. The method of claim 8, wherein the assignment of a modification to the at least one existing field in the first layer is determined such that an even distribution of packet data is sent across a plurality of lines of the trunked network.

10. The method of claim 8, wherein assigning the modification to the at least one existing field in the first layer includes sequentially assigning one of a plurality of possible modifications to the at least one existing field in the first layer as new information in the second layer is received by the Central Processing Unit.

11. The method of claim 8, wherein assigning the modification to the at least one existing field in the first layer includes:
making a calculation based on the information in the second layer.

12. The method of claim 11, wherein the calculation includes a cyclic redundancy check (CRC) hash based on the information in the second layer.

13. The method of claim 12, wherein the information in the second layer includes the Layer 3 destination Internet Protocol (IP) address.

14. The method of claim 8, wherein assigning the modification to the at least one existing field in the first layer includes determining a port in the trunked network with the lowest amount of traffic in a period of time.

15. The method of claim 8, wherein assigning the modification to the at least one existing field in the first layer includes determining a port in the trunked network with the lowest amount of traffic in a period of time unless traffic on all ports in the trunked network is below a predetermined threshold.

16. The method of claim 15, wherein if the traffic on all ports in the trunked network is below the predetermined threshold, the method further comprises:
assigning the modification to the at least one existing field in the first layer sequentially as new second layer information is received by the Central Processing Unit.

17. The method of claim 8, wherein assigning the modification to the at least one existing field in the first layer includes assigning the modification such that the probability of a modification corresponding to a port in the trunked network is proportional to the percentage of free bandwidth available to carry traffic on the port in the trunked network.

18. The method of claim 17, further comprising:
assigning a range of random numbers to a particular modification corresponding to a port in the trunked network, wherein the size of the range is proportional to the desired probability of the particular modification being selected.

19. The method of claim 18, wherein a number is assigned to the data packet by a random number generator, and wherein the number is used to select a particular modification to be applied to the first layer of the data packet by determining which range of random numbers the number assigned to the data packet falls within.

20. A system for data distribution across a trunked network, the system comprising:
at least one input port;
a plurality of trunked output port lines;
a data processing node located between the at least one input port and the plurality of trunked output port lines, wherein the data processing node is configured to receive data packets through the at least one input port, the data packets each including at least two layers, each layer including a plurality of fields, and to modify at least one existing field within a first layer of the data packet based on at least one existing field within a second layer of the data packet and based on a lookup table, so that the data packet will be sent down a particular output port based on the first layer of the data packet, and wherein the modified information in the at least one existing field in the first layer includes a modified Media Access Control (MAC) address, and the lookup table includes a plurality of MAC addresses corresponding to a plurality of orts in the trunked network, wherein each of the plurality of MAC addresses includes a plurality of order bits including highest and lowest bits and wherein the MAC addresses differ only in a limited selection of at least one bit.

21. The system of claim 20, wherein the lookup table connected to the data processing node.

22. The system of claim 21, wherein the lookup table comprises information for modifying the at least one existing field in the first layer of the data packet.

23. The system of claim 22, wherein the information for modifying the existing field in the first layer of the data packet comprised in the lookup table is based on information from a second layer in the data packet.

24. The system of claim 23 further comprising a Central Processing Unit (CPU) connected to the data processing node, wherein the CPU is configured to receive data packet information, to generate a modification to the at least one field in first layer based on the information in the second layer of the data packet, and to update the lookup table with the modification to the at least one field in the first layer.

25. The system of claim 20, wherein the data. processing node is a switch chip.

26. The system of claim 25, further comprising a second switch chip.

27. The system of claim 26, wherein the first switch chip is configured to route the packet data to a destination trunk group and to modify the at least one existing field in the first layer of the data packet, and wherein the second switch chip is configured to determine which line in the trunk group that the data packet will be sent down based on the modified field.

28. The system of claim 27, wherein the at least one exiting field in the first layer includes a plurality of fields.

29. The system of claim 28, wherein the information from the second layer includes information from at least one field in the second layer.

30. The system of claim 29, wherein the at least one field in the second layer includes a plurality of fields.

31. The system of claim 27, wherein the information from the second layer includes information from at least one field in the second layer.

32. The system of claim 31, wherein the at least one field in the second layer includes a plurality of fields.

33. The system of claim 27, wherein the first layer of the data packet is a Layer 2 and the at least one existing field includes a Layer 2 address; and wherein the second layer of the data packet is a Layer 3 and the information regarding the second layer includes at least one Layer 3 address.

34. The system of claim 33 wherein the at least one Layer 2 address includes a Media Access Control destination address, and wherein the at least one Layer 3 address includes an Internet Protocol (IP) destination address.

* * * * *